July 11, 1944. O. L. PEARSON 2,353,582
RECEPTACLE AND CLOSURE MEANS THEREFOR
Filed Oct. 12, 1942

Inventor:
Oke L Pearson,
by John F Brezina
Attorney.

Patented July 11, 1944

2,353,582

UNITED STATES PATENT OFFICE 2,353,582

RECEPTACLE AND CLOSURE MEANS THEREFOR

Oke L. Pearson, Chicago, Ill.

Application October 12, 1942, Serial No. 461,809

6 Claims. (Cl. 229—45)

This invention is directed to novel, disposable receptacles such as cups, dishes and the like as used principally in the marketing of ice cream, cream and cream products, confections and other foods which are adapted to be sold in disposable receptacles which are usually made of paper.

In the marketing of ice cream and similar products and in the marketing of some types of foods, it is well known that disposable paper receptacles are used which are of several presently known types. One presently known form of these disposable receptacles in which ice cream and ice cream products are marketed, is the cup-shaped type having a flat bottom and a slightly inclined continuous and round side wall resembling the common cup in shape. Other types used include conical, conoidal and cylindrical shapes. It is the common practice of the retailer to give the purchaser of ice cream or the like, which is contained in one or more of the presently known receptacles, a disposable substantially flat spoon or paddle of wood or of a substantially stiff pre-formed paper, or some similar inexpensive utensil whereby the purchaser may remove the receptacle contents in the course of eating same.

It is the presently known practice that such spoons of either the paper or wood type are contained in the retail stores in some appropriate receptacle, from which the clerk merely withdraws one or more thereof by hand and hands same to the customer.

In other instances, because of the objectionable feature of contamination of such spoons or the like, manufacturers have begun to place such spoons in continuous paper tube-like envelopes so that a plurality thereof will be within a tunnel-like paper container in end to end relation, and so that the clerk may tear off one or more spoons and container portions at will.

A further objectionable feature encountered in connection with the handling of said so-called spoons is that the same are frequently dropped by the consumer, especially in instances where one consumer buys several packs of ice cream or the like at the counter and carries them to an automobile where other persons consume the same. Such dropping results in rendering the spoons unusable from a sanitary standpoint, necessitating procurance of additional spoons.

An important object of my invention is the provision of the disposable receptacles, made of paper or other inexpensive material, which have disposable covers so constructed as to hold, until actual use thereof, a substantially flat disposable spoon therein in such a manner that the spoon will be substantially covered and protected against any unsanitary or infectious elements of the atmosphere and during handling.

It is an object of my invention to provide a disposable receptacle of fibrous material having an insertable and removable disposable cover which normally fits into the upper opening of the receptacle, and which cover is provided with a diametrically extending passage through which passage a substantially flat spoon or the like may be mounted until actual use by the consumer in removing the contents from the receptacle.

A further object of my invention is the provision of a cup-like disposable receptacle having its continuous upwardly extending side wall terminating in a flanged periphery or rim, which periphery or rim is provided with one or more edge opening slots, which slot or slots are adapted to engage and removably retain a spoon or the like therein until manual removal of such spoon by the consumer.

A further object is the provision of a cup-like disposable receptacle formed of fibrous material and having a disk-like substantially flat cover for closing its upper opening and which cover has means thereon for frictionally engaging and removably retaining a spoon or the like, and wherein said receptacle has its upper rim portion provided with one or more recesses or edge opening slits into which one or both ends of a disposable spoon may be placed so that such spoon will be frictionally engaged by cup portions defining the slot, and whereby said spoon by said engagement with the slot will aid in holding the closure or cover in closing position in the cup and over the contents thereof.

A further object is the provision of a novel closure means or cover adapted for use in connection with disposable cup-like receptacles, which cover has a part thereof partially separated from the remainder thereof so as to provide a transversely extending passage in which a contents-removing member may be removably mounted, and in certain instances partially covered; and also wherein the receptacle into which such closure is placeable has its rim portion suitably recessed or slotted to provide means for frictionally engaging and temporarily retaining the contents removing member, and it is a further object to provide the receptacle body with one or more slots in which an end of a spoon may be inserted so as to cause said spoon to aid in holding the receptacle cover in closed position.

Other and further important objects of my invention will be apparent from the following description and appended claims.

Figure 1:
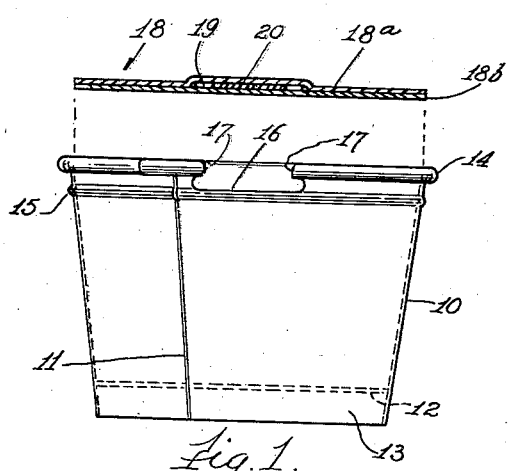
Fig. 1 shows a side elevational view of a disposable paper cup and removable cover therefor and embodying features of my invention.

Referring to Fig. 1, reference numeral 10 designates the rounded body or side wall of a disposable receptacle which is usually initially cut from a single blank and suitably rolled, and the opposite end edges of such blank are overlapped and secured in overlapping relation by a suitable adhesive composition (not shown). Said overlapped edges are generally designated by reference numeral 11. Numeral 12 designates a bottom formed of paper or similar inexpensive fibrous material which is suitably secured with respect to the continuous side wall in any one of a number of manners, as for example by cement. In some forms of disposable cups, the bottom and side walls are formed from a single blank and suitably crimped and pressed in a manner known in the art. In those forms of disposable cups or receptacles which are of the type illustrated in the drawing, the bottom 10 is secured in position substantially inwardly of the bottom rim or bottom annular edge or bottom flange designated by reference numeral 13.

Figure 4:
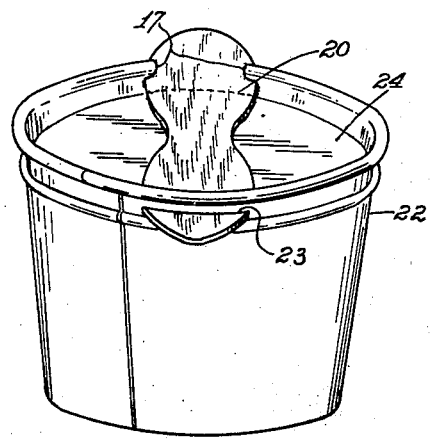
Fig. 4 is a perspective view of a disposable cup-like receptacle illustrating the rim provided with a slot and a recess and with a typical spoon removably mounted therein and holding the substantially flat cover in closed position.

The normally upper annular edges of disposable receptacles are usually flanged in one manner or another to provide reinforcing edges and to impart rigidity to the receptacle as well as to eliminate an undesirable sharp upper edge. As illustrated in Figs. 1 and 4, the upper annular edge is formed to provide a flange 14, which in the particular illustration, is formed by rolling the edge back upon itself and downwardly. The type of flange, or its presence, in the disposable receptacle is immaterial from the standpoint of the invention herein described and claimed, though one form of presently known flange is illustrated as integral with the upper rim portion of the receptacle. Nearly all disposable receptacles formed of paper or other fibrous material are preferably of substantially conoidal shape wherein the continuous side wall is gradually enlarged and flares outwardly so that the area of the opening of the receptacle is slightly greater than the area at the receptacle mouth. This feature is advantageous in manufacture of these receptacles as well as in stacking and packaging thereof so as to permit compact nesting of the receptacles.

Referring to Fig. 1, reference numeral 15 designates an optional bead which defines an inwardly opening circumferential groove which is formed a short distance below the upper edge or flange 14 substantially as illustrated. Such groove and bead is formed in the receptacles by pressing the side wall 10 outwardly with a suitable die in a manner known in the art. Said inwardly opening groove provides a seat for the periphery of the disk-like cover and aids in retention of said cover in closed position after such cover has been placed into the cup into sealing position.

The rim or upper portion of the receptacle side wall 10, which carries the flange 14, is provided with a relatively wide recess 16 which is preferably, though not necessarily, formed by die-cutting of the blank from which the side wall 10 is formed and while the blank is substantially flat. Such recess may also be die-cut after formation of the receptacle if desired. Recess 16 is shaped so that it is wider at its lower part than at the entrance thereof, it being defined by opposed notches as indicated, which are a continuation of the recess and which provide tongue-like extensions 17 integral with the flanged upper portion of the cup. Such extensions 17 preferably include portions of the rolled back flange 14 so that said tongues are relatively rigid though yieldable and flexible.

Reference numeral 18 designates a disk-like cover which is cut from suitable paper or other fibrous material and of a shape and size so that the same may be inserted into the upper end of the receptacle so that the peripheral edge of the cover engages the inner surface of the receptacle side wall 10, as is for example illustrated in Fig. 4. In instances where the receptacle is provided with an annular inwardly opening groove such as groove 15, the cover is pressed into the receptacle until it seats in said groove. Said cover may be formed either as a single unit or formed from a plurality of layers or plys of relatively stiff paper or fibrous material. I have illustrated in Fig. 1 only such a cover formed of upper and lower layers 18a and 18b respectively, and which are secured together in any suitable manner, for example by glue, staples or equivalent means.

The disk-like cover 18 is provided with a diametrically extending passage or tunnel 19, whose ends terminate at or substantially at the periphery of the cover 18. Said passage may be formed by pressing out a central area of either one or both of the layers forming said cover 18, the particular illustration of Fig. 1 showing the upper layer as being pressed outwardly so that when the two layers are connected together into adjacent relation, a diametrically extending passage or tunnel is thereby formed. Such pressing out of one or both of the layers forming said cover 18 may be satisfactorily formed by suitable cooperating dies between which the layer or layers of the cover are pressed, and after such pressed-out operation, the normal texture, composition and stiffness of the material forming said layers will result in a substantial retention of the shape imparted thereto by such pressing operation.

The diametrically extending passage 19 is adapted to have inserted and removably mounted therein a substantially flat spoon or equivalent member adapted for use in removal of the receptacle contents. While in some instances the size of the receptacle and its cover is sufficient to receive the entire spoon, in the case of many disposable receptacles, particularly such as those used for ice cream the sizes of the receptacle and the diameter of the receptacle covers are such that only a major portion of the spoon can be inserted into the tunnel or passage 19, in which passage said spoon is enclosed and protected against contamination from the atmosphere, handling and the like. In most instances of the receptacles of relatively limited size, such as illustrated in the drawing, the desirable length of the spoon is greater than the diameter of the cover so that only a major part of the spoon will be enclosed when inserted into the passage or passages of said cover.

In such instances, the projecting portion of the spoon 20 will be pressed and seated in the recess 16 so as to cause the opposite lateral edges of the projecting end portion of the spoon to engage and slightly bend the opposed projections 17 which partially define said recess 16. As the projecting end of the spoon is so pressed into the recess 16, it will seat into the wider part of said recess 16, and during such inserting movement the opposite edges of the spoon will "snap" by the flexing of projections 17, which projections 17, by their natural stiffness, will at least partially flex back to substantially their normal position to thereby effect a frictional engagement between a part of the edges of the blank which define the inner portion of said projections 17. Because of the normal action of said projections 17 in substantially returning to their normal position wherein they project substantially toward each other, the end portion of the spoon which has been pressed into said recess 16 will be frictionally engaged by the edges defining the notches at the ends of recess 16 and partially by the continuing edge which partially defines the projections 17, this causing a spoon, which is mounted, to be removably mounted until it is desired to manually remove said spoon and the cover, and further causing the cooperative action of said spoon and said receptacle-wall extensions 17 to aid in holding the cover in normally closing and sealing positions. This additional "holding" and retention of the cover in sealing position is a desirable one especially with some types of foods and confections. In addition to the said cooperating function of holding a cover by the aforesaid engagement, the contents removing member or "spoon" provides a convenient element, bar or member for use in removing the cover from closing position over the contents. One way of using said spoon also as a cover removing means is to insert an end of the spoon beneath the edge of the cover to thereby either pry or pull it off from sealing position.

I desire it to be understood that the size of the recess, and within reasonable limits, the shape thereof, may be varied so that the inner wider portion of the recess 16 will be only slightly wider than the spoons to be used both as a cover-holding means and as a means for removal of the contents, and that the particular size of the recess 16 may be varied so that the normal distance between the projections 17 will be slightly less than the width of the portion of the spoon which will be used therewith in substantially the described manner.

Figure 3:
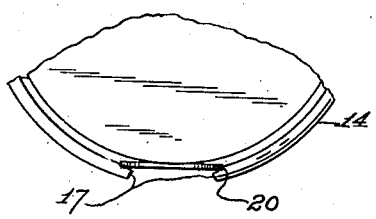
Fig. 3 is an enlarged top plan view of the receptacle of Fig. 1 illustrating one manner of mounting a spoon or the like on said receptacle.

In Fig. 3 I have illustrated said edge-opening slot or recess 16 from above and having a typical substantially flat spoon removably anchored or suspended therein. Inasmuch as the average spoon, whether made of wood, paper or other material, has its intermediate part substantially narrower than either of its end portions, the provision of a receptacle having one or more edge opening slots 16 in its rim provides convenient means for mounting a spoon either in the position shown in Fig. 3, or in a position wherein the greater part of the spoon will lie across the cover with one end anchored in the slot or recess 16 in the manner hereinbefore described. This means of mounting the spoon in such edge-opening slot causes the opposite edges and projections defining said slot or recess to engage and impinge the opposite edges of the spoon to prevent its dropping off during normal carrying of the receptacle and its contents from either the point of packaging or the point of retail delivery to the point of consumption of the contents.

In Fig. 4 I have illustrated the similar form of disposable receptacle such as used for ice cream and other confections in which the receptacle designated as 22 has its upper flanged rim portion provided with a cut-out edge-opening recess or slot 16 illustrated in dotted lines in the upper portion of the figure, and wherein the rim of said receptacle carries the opposed integral extensions 17.

Reference numeral 23 designates a horizontally extending slot which is preferably formed simultaneously with the usual cut-out process of the blank itself before its formation into the side wall of the receptacle, said slot 23 being in a position so that it will be substantially diametrically opposite the recess 16. In this instance, a disposable spoon of the type hereinbefore referred to is removably mounted or anchored to the receptacle by inserting one end of the spoon 20 into the slot 23, and thereupon pressing the opposite end of the spoon into slot 16 so that said spoon will thereupon lie against the previously inserted disk-like cover 24, and thereby aid in holding said cover in sealing position.

Figure 2:
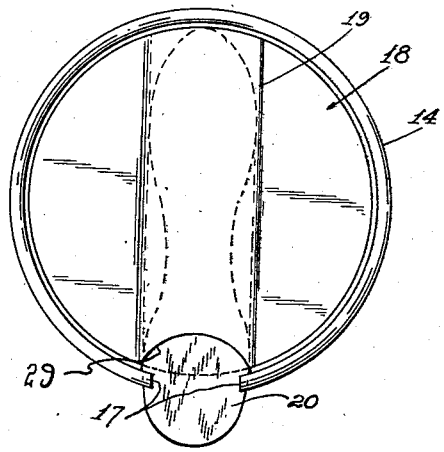
Fig. 2 is a top plan view of a disposable cover adapted for use as a closure for disposable receptacles such as illustrated in Fig. 1, and illustrating a typical spoon in a passage thereof.

As is illustrated in Fig. 2, the cover 18 may optionally have its upper layer portion or ply formed with a suitable arcuate recess 29 which opens on its periphery and upon an end of the transverse passage in said cover. Such recess provides for exposing a part of the contents-removing member so that such member may be readily gripped or frictionally engaged by a finger to facilitate withdrawal of such member even in instances where the contents-removing member is of a length wherein its end does not project beyond the recess 16 of the receptacle wall.

I am aware that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof.

I claim as my invention:

1. In combination with a disposable receptacle for ice cream or the like and having an upwardly extending side wall terminating in an annular rim; a removable disposable disk-like cover formed of a plurality of layers of fibrous material; said cover being adapted to be removably mounted in the upper part of said receptacle so that its peripheral edge frictionally engages the inner surface of said receptacle rim; said cover layers being spaced apart along a diametrically extending path to form a transversely extending passage, said passage being adapted to removably mount a spoon therein, the upper of said covering layers having a peripheral recess at one end of said passage to expose a grippable portion of said spoon, said cover providing a sanitary covering for said spoon.

2. In combination with a disposable receptacle for ice cream or the like and having an upwardly extending side wall terminating in an annular rim; said rim having an upwardly opening recess;

a removable disposable disk-like cover formed of a plurality of layers of fibrous material; said cover being adapted to be removably mounted in the upper part of said receptacle so that its peripheral edge frictionally engages the inner surface of said receptacle rim; said cover layers being spaced apart along a part of their area to form a diametrically extending passage; and a disposable substantially flat member removably mounted in said passage of said cover and having one end portion thereof frictionally engaging said rim recess of said receptacle to aid in holding the cover in position in said receptacle, and to provide a grippable member to facilitate manual removal of said cover.

3. In combination with a disposable receptacle for ice cream or the like having a continuous upwardly extending side wall terminating in an annular rim; a removable disposable disk-like cover formed of fibrous material; said cover being adapted to be removably mounted in the upper part of said receptacle so that its peripheral edge frictionally engages the surface of said receptacle rim; said cover between its top and bottom surfaces having a diametrically extending passage defining a substantially transversely extending path; said passage of said cover being adapted to receive and removably retain a spoon or the like, the edge portion of said cover having a peripheral recess therein to provide for exposing a grippable portion of said spoon.

4. In combination with a disposable receptacle for ice cream or the like having an upwardly extending continuous side wall terminating in an upper annular rim; a removable disposable disk-like cover formed of a plurality of partially spaced apart layers of fibrous material; said cover being adapted to be removably mounted in the upper part of said receptacle so that its peripheral edge engages the inner surface of said receptacle rim; portions of said cover being spaced apart along a diametrically extending path to form a diametrically extending passage; said receptacle rim having an upwardly opening slot therein partially defined by opposed relatively short tongue-like extensions at the ends of said slot; a relatively stiff disposable utensil member removably mounted in said cover passage and partially projecting therefrom and normally locked therein by engagement of its lateral edges beneath said extensions, said last mentioned locking engagement retaining said cover in closing position in said receptacle, said projecting portion of said disposable member providing a grippable handle whereby said cover may be removed from receptacle-sealing position.

5. In a disposable receptacle for confections or the like, a cup-like body including a bottom and an upwardly extending continuous annular side wall, said wall having an inwardly opening annular groove near its upward edge; the upper edge of said body having a substantially wide recess therein and having a pair of extensions integral with the upper portions of said side wall and projecting into said recess; a disk-like substantially flat cover of fibrous material and formed of two layers partially connected together and having a substantially diametrically extending passage therebetween, said passage being adapted to receive and retain a stiff substantially flat spoon-like member; said cover, when mounted, frictionally engaging said receptacle side wall groove; said cover being adapted to protectively envelop said spoon-like member; one end of said spoon normally projecting from said passage and frictionally engaging the recess of the rim of said receptacle to aid the retention of said cover in said receptacle, and to provide a grippable handle to facilitate the removal of said cover from sealing position.

6. In combination with a disposable receptacle for ice cream or the like having an upwardly extending side wall terminating in an upper flanged rim; a removable disposable disk-like cover formed of a plurality of partially spaced apart layers of fibrous material; said cover being adapted to be removably mounted in the upper part of said receptacle so that its peripheral edge frictionally engages the inner surface of said receptacle upper edge; said layers forming said covering being spaced apart to provide a diametrically extending passage; said receptacle rim having a relatively wide edge opening recess therein, said side wall adjacent said rim having a slot therein diametrically opposite to said recess; said cover passage being adapted to receive and retain a substantially flat relatively stiff disposable spoon member, the lateral edges of said spoon member being adapted to lock in said recess; the end portion of said spoon member, which projects beyond the cover, providing a handle means for manual removal of the cover from closing position in the receptacle; one end portion of said spoon member being adapted to engage said rim slot to thereby normally hold said cover against removal during normal handling.

OKE L. PEARSON.